United States Patent [19]
Adusumilli et al.

[11] Patent Number: 5,761,454
[45] Date of Patent: Jun. 2, 1998

[54] DEADLOCK RESOLUTION METHODS AND APPARATUS FOR INTERFACING CONCURRENT AND ASYNCHRONOUS BUSES

[75] Inventors: Swaroop Adusumilli, Tempe; Barry M. Davis, Phoenix; Brian N. Fall, Chandler, all of Ariz.; Nicholas J. Richardson, La Jolla, Calif.; Philip Wszolek, Phoenix, Ariz.

[73] Assignee: VLSI Technology, Inc., San Jose, Calif.

[21] Appl. No.: 703,563

[22] Filed: Aug. 27, 1996
(Under 37 CFR 1.47)

[51] Int. Cl.$^6$ ............................................. G06F 13/36
[52] U.S. Cl. ..................... 395/306; 395/308; 395/393; 395/856; 395/285; 395/287; 395/288; 395/726
[58] Field of Search ............................... 395/306, 308, 395/309, 185.01, 293, 856, 285, 287, 288, 726

[56] References Cited

U.S. PATENT DOCUMENTS

| | | | |
|---|---|---|---|
| 5,469,547 | 11/1995 | Pawlowski | 395/285 |
| 5,544,332 | 8/1996 | Chen | 395/288 |
| 5,625,779 | 4/1997 | Solomon et al. | 395/293 |
| 5,666,556 | 9/1997 | Khandekar et al. | 395/822 |

OTHER PUBLICATIONS

VLSI Technology, Inc., Personal Computer Division Device Functional Specification VL82C535, Document No. 05–000029, Revision *B, Jan. 25, 1996.
Electronic Engineering Times, VLSI Lanuches Lynx set for Pentium, Jun. 19, 1995, Issue 853, A CMP Publication.
VLSI Technology, Inc., Product Bulletin, MESA Lynx/Anigma Reference Design, 1995.
VLSI Technology, Inc., Product Bulletin, Lynx Desktop Solution for 586–Class Processors, 1995.
VLSI Technology, Inc., Product Bulletin, Lynx/75 Desktop Solution for 75MHz, 586–Class Processors, 1996.

Primary Examiner—Jack B. Harvey
Assistant Examiner—Ario Etienne
Attorney, Agent, or Firm—Hickman & Martine, LLP

[57] ABSTRACT

A deadlock detection and resolution circuit for resolving a deadlock condition in a bridge circuit coupled to a memory, a host bus and a PCI bus of a computer system. The host bus and the PCI bus are configured to operate concurrently and asynchronously. The bridge circuit includes a host master circuit and a PCI slave circuit coupled between the host bus and the PCI bus and configured to service a PCI-MEMORY instruction from an external PCI master coupled to the PCI bus. A PCI master circuit and a host slave circuit within the bridge circuit couples between the PCI bus and the host bus and configured to service a CPU-PCI transaction from a CPU coupled to the host bus. The aforementioned deadlock condition occurs when the PCI-MEMORY transaction proceeds simultaneous with an issuance of the CPU-PCI transaction. The deadlock detection and resolution circuit includes first circuit for asserting an asynchronous handshake signal to the PCI slave of the bridge circuit. There is further included second circuit for determining whether the PCI slave is still able to complete the PCI-MEMORY transaction. Additionally, there is included third circuit for asserting an asynchronous handshake acknowledge signal to cancel the CPU-PCI transaction and removing the deadlock condition if the PCI slave is unable to complete the PCI-MEMORY transaction.

24 Claims, 4 Drawing Sheets

DEADLOCK RESOLUTION METHODS AND APPARATUS FOR INTERFACING CONCURRENT AND ASYNCHRONOUS BUSES

BACKGROUND OF THE INVENTION

The present invention relates generally to computer systems. More specifically to methods and apparatus for interfacing a Peripheral Connect Interface (PCI) bus with a host bus, wherein the PCI bus operates in accordance with PCI Specification Revision 2.1 Latency Guidelines and wherein the buses operate concurrently with asynchronous clocks.

Typical computer systems, such as standard personal computers, workstations, mainframes and the like, utilize buses to provide a path for data and control signals from one circuit to another. For example, in a basic PC architecture there is typically a host bus for connecting a microprocessor or central processing unit (CPU) to a system memory and other circuits. Through the host bus, the CPU may, for example, write data to or read data from the system memory. The host bus is designed to operate in accordance with a specific protocol and at a specific clock speed. By adhering to this protocol, the CPU and other circuits of the basic PC computer may communicate via the host bus.

In more advanced computer architectures, there may be several buses in a given computer system. The provision of multiple buses permits the computer system to employ a wider range of peripheral devices, thereby greatly extending the power of the computer system that results. As is often the case, these buses may employ different protocols and may run at different clock speeds. To allow the CPU and the peripheral devices on the various buses to work together, bridge circuits are typically provided between buses. Among other functions, bridge circuits arbitrate memory accesses by the CPU and the peripheral devices on the various buses to ensure that those memory requests are properly and efficiently serviced.

Figure 1:
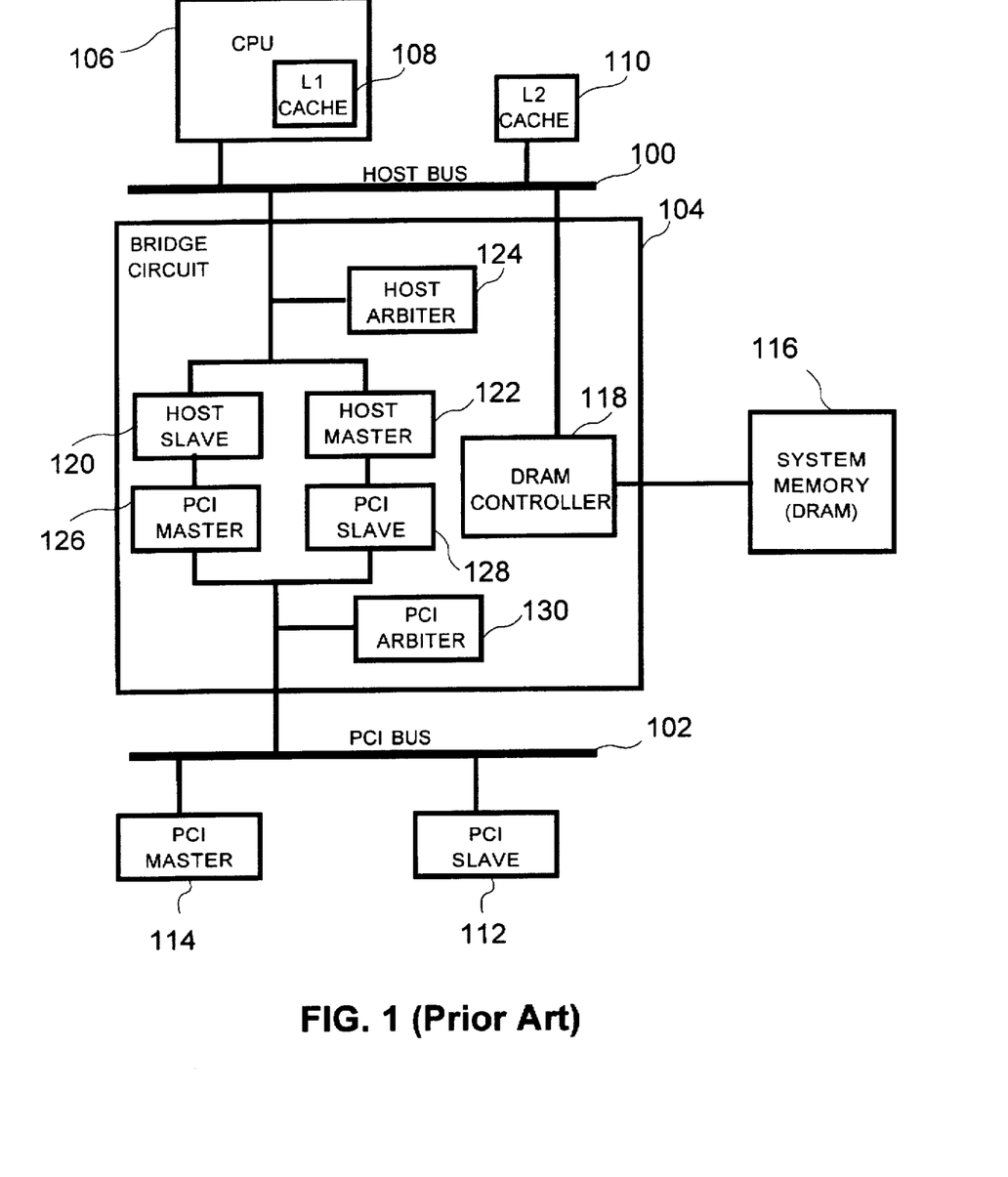
FIG. 1 illustrates a partial block diagram of a prior art computer system having a host bus, a PCI bus, and a bridge circuit.

To facilitate discussion, FIG. 1 illustrates a partial block diagram of a typical computer system having two different buses, a host bus 100 and a PCI bus 102. Bridge circuit 104, representing a prior art bridge circuit such as the Wildcat bridge circuit, available from VSLI Corp. of San Jose, Calif., couple between host bus 100 and PCI bus 102. A CPU 106 connects to host bus 100. In the present example, CPU 106 represents one of the X86 family of microprocessors, e.g., a Pentium™ processor or one of its compatibles or relatives, which is available from Intel Corp. of Santa Clara, Calif., or other processor manufacturers such as Texas Instruments of Dallas, Tex., Cyrix of Richardson, Tex., Advanced Micro Devices of Sunnyvale, Calif. Host bus 100 represents any number of well known buses suitable for coupling CPU 106 to system memory and peripheral circuits. In the example of FIG. 1, host bus 100 may run at 66 MHz, for example, although the specific clock speed of host bus 100 is irrelevant to the inventive concept disclosed herein.

There is also shown in FIG. 1 an L1 cache 108, which provides a high-speed temporary data and instruction storage space for the computing circuits within CPU 106. There may also be an optional L2 cache 110 connected to host bus 100 for additional high-speed data storage. Note that other circuits, such as additional CPUs, memory chips, input/output circuits, etc., may also be connected to host bus 100.

PCI bus 102 represents a bus running in accordance with the well-known PCI protocol, which is a set of bus specification promulgated by the PCI Special Interest Group (P.O. Box 14070, Portland, Oreg.). An external PCI slave 112 and an external PCI master 114 connects to PCI bus 102. External PCI slave 112 represents a circuit configured as a target circuit for access, via PCI bus 102, by other circuits. External PCI slave 112 may represent, for example, a magnetic disk drive, a magnetic tape drive, an optically readable device such as a CD ROM drive, a semiconductor memory such as PCMCIA card, a display device, an output device such as a printer, and the like. External PCI master 114 may represent a circuit configured to access, via PCI bus 102, other target circuits such as external PCI slave 112 or PCI slave 128. As is well known, some circuits may function as both an external PCI master 114 and as an external PCI slave 112.

Bridge circuit 104 provides an interface between host bus 100 and PCI bus 102.

Via bridge circuit 104, either CPU 106 or PCI masters (such as PCI master 114) may access a system memory 116 via a memory controller 118. System memory 116 may be implemented by, for example, dynamic random access memory (DRAM) or any other suitable memory technology such as flash memory. In the example of FIG. 1, DRAM controller 118 is connected directly to host bus 100 and to system memory 116. When system memory 116 is accessed for reading or writing, DRAM controller 118 acts as a slave circuit to receive and service the read or write instructions from CPU 106 or PCI master 114 (via host bus 100 and PCI bus 102, respectively). For example, CPU 106, acting as a master circuit having mastership of host bus 100, may read from or write to system memory 116 via DRAM controller 118. As a further example, PCI master 114, having mastership of both PCI bus 102 and host bus 100, may read from or write to system memory 116 via PCI bus 102 and host bus 100.

To interface with host bus 100, bridge circuit 104 typically includes a host slave 120, a host master 122, and a host arbiter 124 connected to host bus 100. Host slave 120 represents a slave circuit to host bus 100 for allowing other circuits on host bus 100, such as CPU 106, to access bridge circuit 104 (via host bus 100). Host master 122 represents a master circuit to host bus 100 for allowing bridge circuit 104, on behalf of other circuits, to access circuits coupled to host bus 100. By way of example, host master 122 may act as a master circuit on behalf of PCI master 114 for allowing PCI master 114 to access L2 cache 110 (via PCI bus 102 and host bus 100) or L1 cache 110.

Host arbiter 124 represents the controlling circuit which grants mastership or control of host bus 100 to selected host bus masters, such as host master 122 or CPU 106 or L2 cache controller 110. For example, if host master 122 requires access to host bus 100 to access L2 cache 110, then host master 122 may request control of host bus 100 from host arbiter 124.

To interface with PCI bus 102, bridge circuit 104 typically includes a PCI master 126, a PCI slave 128 and a PCI arbiter 130 connected to PCI bus 102. PCI slave 128 represents a slave circuit to PCI bus 102 for allowing other circuits on PCI bus 102, such as external PCI master 114, to access bridge circuit 104 (via PCI bus 102). PCI master 126 represents a master circuit to PCI bus 102 for allowing bridge circuit 104 to access, on behalf of other circuits, target circuits coupled to PCI bus 102 (such as external PCI slave 112). PCI arbiter 130 is the controlling circuit which grants mastership or control of PCI bus 102 to selected PCI bus masters, such as external PCI master 114 and PCI master 126. For example, if PCI master 114 requires access to PCI bus 102 to access system memory 116, then PCI master 114 may request control of PCI bus 102 from PCI arbiter 130. Similarly, a master circuit on host bus 100, such as CPU 106, may also request, via PCI master 126, mastership or control of PCI bus 102 from PCI arbiter 130 if it needs to access a target circuit on PCI bus 102, e.g., PCI slave 112.

L1 cache 108 and L2 cache 110 represent fast memory caches for temporarily storing data or instruction for use by CPU 106. Since the data in L1 cache 108 and L2 cache 110 may represent updated data (relative to their counterparts in system memory 116), it is necessary to snoop L1 cache 108 and L2 cache 110 when access to data within system memory 116 is desired. By way of example, if PCI master 114 needs to access data having specific addresses in system memory 116, PCI master 114 needs to have mastership of host bus 100 to snoop L1 cache 108 and L2 cache 110 prior to going to system memory 116 to ensure that the data it obtains represents the most updated version of the required data.

Note that a memory access cycle by either CPU 106 or a PCI master, e.g., PCI master 114 through host master 122, requires the use of host bus 100. Consequently, host bus 100 becomes the bottleneck to system performance since host bus 100 is needed by memory access cycles of both CPU 106 and PCI master 114. Further, there are instances where both CPU 106 and PCI master 114 simultaneously require use of host bus 100 and PCI bus 102, potentially causing a condition known as deadlock.

The deadlock problem may be better understood with reference again to FIG. 1. In FIG. 1, suppose CPU 106 wishes to access PCI slave 112 (a CPU-PCI cycle) via host slave 120 and PCI master 126. PCI slave 112 may represent, for example, a disk drive, and CPU 106 wishes to write to the disk via the CPU-PCI cycle. CPU 106 puts out a request for PCI slave 112, which is responded to by host slave 120. At this point, host slave 120, via PCI master 126, requests PCI bus 102 from PCI arbiter 130. Once mastership of PCI bus 102 is obtained PCI master 126 tries, on behalf of host slave 120 and CPU 106, to access the target PCI slave 112.

If the CPU-PCI cycle is unsuccessful, e.g., PCI slave 112 is busy, PCI arbiter 130 may deassert the grant of PCI bus 102 to PCI master 126 and grants PCI bus 102 to another PCI master. At this point, CPU 106 still has mastership of host bus 100 and is still ready to go forward with the CPU-PCI transaction. However, the CPU-PCI transaction is temporarily on hold since PCI master 126 is temporarily put on hold by PCI arbiter 130.

If PCI master 114 desires to access system memory 116 (a PCI-DRAM cycle) at this time, it will first request PCI bus 102 from PCI arbiter 130. For the purpose of this example, PCI master 114 may wish to perform a direct memory access (DMA) cycle, i.e., accessing system memory 116 directly without requiring the intervention by CPU 106. Since PCI master 126 no longer holds PCI bus 102, mastership of PCI bus 102 is granted to PCI master 114. PCI master 114 proceeds to issue the PCI-DRAM request, which is accepted and responded to by PCI slave 128. Thereafter, PCI slave 128 requests host arbiter 124, via host master 122, mastership of host bus 100 so it can snoop in L1 cache 108 and L2 cache 110 as discussed earlier.

Unfortunately, bridge circuit 104 is deadlocked since host bus 100 is still held by CPU 106, and will not be released until mastership of PCI bus 102 is obtained to allow CPU 106 to complete its CPU-PCI transaction. PCI bus 102 is currently held by PCI master 114, which requires host bus 100 to complete its PCI-DRAM transaction. Unless the deadlock is resolved, the computer system is effectively inoperable at this point.

In the prior art drawing of FIG. 1, deadlock conditions can be prevented using well known prior art techniques. In accordance with one prior art technique, host master 122 asserts a hold signal to CPU 106 to ask for mastership of host bus 100. At this time, PCI master 114 is retried since host master 122 has not gained control of host bus 100. When CPU 106 can comply, CPU 106 acknowledges the hold request from host master 122 by asserting a "HOLD_ACK" signal, which signifies to host master 122 that CPU 106 has held back and host master 122 may now obtain mastership of host bus 100 from host arbiter 124 to service its PCI-DRAM cycle.

While the above solution works adequately for prior art computer systems, the bridge circuit 104 of FIG. 1 does not allow concurrent operations on host bus 100 and PCI bus 102. For example, concurrent operation is limited in FIG. 1 while PCI master 114 has mastership of host bus 100 to perform its memory access since CPU 106 cannot simultaneously make use of host bus 100 to employ the relatively larger L2 cache 110 (e.g., up to 1 Megabyte) for its operations. Instead, CPU 106 must rely on the relatively small L1 cache 108 (typically around 16 Kbytes) for its operation or must remain idle during those times. If a bridge circuit can be designed to allow for concurrent operations, however, a different technique for resolving deadlock resolution that can handle concurrent CPU/PCI master operations will be necessary.

Still further, the adoption of PCI Bus Specification Revision 2.1 available from the PCI Special Interest Group of Portland, Oreg., and incorporated herein by reference, poses additional challenges to designers who search for ways to avoid potential deadlock and race conditions. The PCI Bus Specification Revision 2.1 Latency Guidelines dictate that PCI slaves (e.g., PCI slave 128 in bridge circuit 204) must retry a transaction if it takes more than 32 PCI clocks to complete a lead off cycle or more than 8 PCI clocks to complete a subsequent data phase in a burst transaction. In other words, if it takes more than 32 PCI clocks for host arbiter 124 to grant host bus 100 to host master 122 from the moment host master 122 requests host arbiter 108 for host bus 100 (e.g., upon detecting that there is data in write buffer 210), the transaction must be retried. Likewise, if more than 8 PCI clocks pass between bursts of data in a burst transaction, the transaction must be retried by the PCI slave.

In view of the foregoing, what is needed are methods and apparatuses for resolving deadlock conditions in computer systems employing asynchronous host and PCI buses, wherein the PCI bus complies with PCI Revision 2.1 Latency Guideline and wherein concurrent operations on host and PCI buses are permitted.

SUMMARY OF THE INVENTION

The present invention relates, in one embodiment, to a method for resolving a deadlock condition in a bridge circuit coupled to a memory, a host bus and a PCI bus of a computer system. The host bus and the PCI bus are configured to operate concurrently and asynchronously. The bridge circuit includes a host master circuit and a PCI slave circuit coupled between the host bus and the PCI bus and configured to service a PCI-MEMORY instruction from an external PCI master coupled to the PCI bus. A PCI master circuit and a host slave circuit within the bridge circuit couples between the PCI bus and the host bus and configured to service a CPU-PCI transaction from a CPU coupled to the host bus. The aforementioned deadlock condition occurs when the PCI-MEMORY transaction proceeds simultaneous with an issuance of the CPU-PCI transaction. The method includes asserting an asynchronous handshake signal to the PCI slave of the bridge circuit upon detecting the deadlock condition. The method further includes determining whether the PCI slave is still able to complete the PCI-MEMORY transaction. Additionally, the method includes asserting an asynchronous handshake acknowledge signal to cancel the CPU-PCI transaction and removing the deadlock condition if the PCI slave is unable to complete the PCI-MEMORY transaction.

In another embodiment, the invention relates to a deadlock detection and resolution circuit for resolving a deadlock condition in a bridge circuit coupled to a memory, a host bus and a PCI bus of a computer system The host bus and the PCI bus are configured to operate concurrently and asynchronously. The bridge circuit includes a host master circuit and a PCI slave circuit coupled between the host bus and the PCI bus and configured to service a PCI-MEMORY instruction from an external PCI master coupled to the PCI bus. A PCI master circuit and a host slave circuit within the bridge circuit couples between the PCI bus and the host bus and configured to service a CPU-PCI transaction from a CPU coupled to the host bus. The aforementioned deadlock condition occurs when the PCI-MEMORY transaction proceeds simultaneous with an issuance of the CPU-PCI transaction. The deadlock detection and resolution circuit includes first circuit for asserting an asynchronous handshake signal to the PCI slave of the bridge circuit. There is further included second circuit for determining whether the PCI slave is still able to complete the PCI-MEMORY transaction. Additionally, there is included third circuit for asserting an asynchronous handshake acknowledge signal to cancel the CPU-PCI transaction and removing the deadlock condition if the PCI slave is unable to complete the PCI-MEMORY transaction.

These and other advantages of the present invention will become apparent upon reading the following detailed descriptions and studying the various figures of the drawings.

BRIEF DESCRIPTION OF THE DRAWINGS

The invention and advantages thereof may best be understood by reference to the following description taken in conjunction with the accompanying claims and drawings in which:

DETAILED DESCRIPTION OF THE PREFERRED EMBODIMENTS

An invention is described for an interface, or bridge circuit, between a CPU bus and a PCI bus that operate with asynchronous CPU and PCI clocks. The bridge circuit permits concurrent operations on the CPU bus and the PCI bus while allowing the PCI bus to conform with PCI Specification Rev. 2.1 Latency Constraints. In the following description, numerous specific details are set forth in order to provide a thorough understanding of the present invention. It will be obvious, however, to one skilled in the art, that the present invention may be practiced without some or all of the specific details. In other instances, well-known digital and analog circuits and computer implemented instruction techniques have not been described in detail in order not to unnecessarily obscure the present invention.

Figure 2:
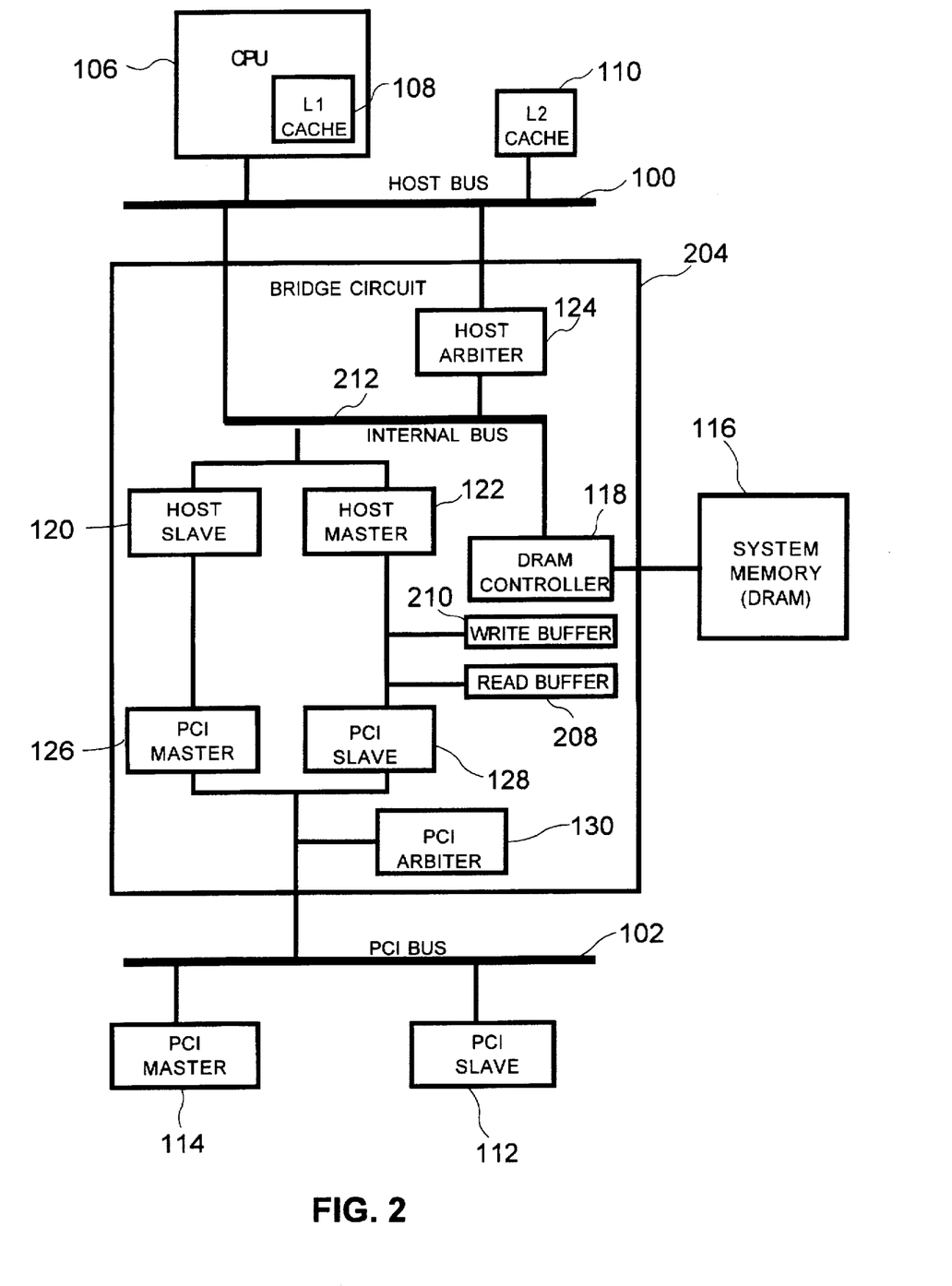
FIG. 2 illustrates a partial block diagram of a computer system having a host bus, a PCI bus, and an improved bridge circuit that facilitates concurrent and asynchronous CPU/PCI operations in accordance with one embodiment of the present invention.

FIG. 2 illustrates an improved bridge circuit 204 wherein concurrent operation is achieved by providing an internal bus within the bridge circuit 204. Bridge circuit 204 represents, for example, a Lynx System Controller, known by its part number VL82C541, available from VLSI Corp. of San Jose, Calif. The Lynx System Controller Internal Architecture Specification is incorporated herein by reference. In FIG. 2, there is provided an internal bus 212, representing the internal bus for allowing concurrent operations by both CPU 106 and PCI master 114 while PCI master 114 accesses system memory 116. When PCI master 114 needs to access system memory 116, it requests mastership of host bus 100 from host arbiter 124 (via host master 122) to briefly to snoop L1 cache 108 and L2 cache 110. If there is no cache hit, host arbiter 124 revokes the earlier grant of host bus 100 to host master 122, thereby allowing CPU 106 to continue operation utilizing both L1 cache 108 and L2 cache 110 (via host bus 100). Meanwhile, PCI master 122, having satisfied that L1 cache 108 and L2 cache 110 do not contain more updated data, concurrently accesses system memory 116 to service the CPU-DRAM cycle initiated by PCI master 114 via internal bus 212.

Internal bus 212 may well be substituted by gating logic that, responsive to appropriate control signals, directs the stream of data and instructions to and from host master 122, host slave 120, DRAM controller 118, and host bus 100. For example, the gating logic may receive data and addresses from PCI master 114 (via host master 122) and forward them to L1 cache 108, L2 cache 110, and DRAM controller 118 during a PCI-DRAM cycle. Alternatively, the gating logic may receive data and address from CPU 106 (via host bus 100) and forward them to host slave 120 during a CPU-PCI cycle.

Host bridge circuit 204 of FIG. 2 also permits host bus 100 and PCI bus 102 to operate asynchronously, ie., with asynchronous PCI and CPU clocks, thereby enabling the computer system to operate at an optimal level of efficiency and/or to employ a wider range of peripheral devices. To further enabling the computer system of FIG. 2 to interface with peripheral devices complying with PCI Specification Rev. 2.1 Latency Guidelines, bridge circuit 204 also complies, on the PCI side, with the above Latency Guidelines. For further detail regarding bridge circuit 204, reference may be made to, for example, the Lynx System Controller Internal Architecture Specification.

When a deadlock condition occurs in bridge circuit 204, solutions need to be developed to resolve the deadlock. A deadlock condition may occur when both host bus 100 and internal bus 212 are held by CPU 106 (in circumstances analogous to those described in connection with FIG. 1) and will not be released until mastership of PCI bus 102 is achieved to complete the CPU-PCI transaction. Simultaneously, PCI bus 102 is held by PCI master 114 and will not be released until the PCI-DRAM cycle is completed, which requires host bus 100 (currently held by CPU 106).

Deadlocks occur since neither CPU 106 nor PCI master 114 can proceed with its respective transaction until the other relinquishes mastership over the bus the other currently holds.

A potential solution for resolving the above-discussed deadlock problem involves backing off CPU 106, i.e., canceling the pending CPU-PCI transaction on host bus 100, to allow the pending PCI-DRAM cycle from PCI master 114 to complete first. Backing off the CPU in a deadlock situation is a simpler solution than backing off the PCI master since there are complications associated with backing off a PCI master. For example, once PCI master 114 is backed of it is not certain whether PCI arbiter 130 would grant PCI bus 102 back to PCI master 114 once the condition that caused the deadlock, i.e., the pending CPU-PCI transaction, is completed. PCI arbiter 130 may, for example, decide to grant PCI bus 102 to another PCI master. Further, there are latency, self-modifying status, and ISA bus deadlock issues that must be addressed when a PCI master is backed off and the PCI-DRAM cycle is interrupted. It is simpler to back off CPU 106 in a deadlock situation since CPU 106 can be made to always retry the same interrupted instruction.

In a deadlock situation, CPU 106 may be backed off as follows. For example, whenever host arbiter 124 perceives that host slave 120 is busy (indicating that a CPU-PCI transaction is in progress) and host master 122 is asserting a request for host bus 100 (indicating that a PCI-DRAM transaction is also in progress), host arbiter 124 may back off CPU 106 to allow the PCI-DRAM transaction to complete first. Once the PCI-DRAM transaction is completed, CPU 106 may retry the canceled CPU-PCI transaction.

Although backing off CPU 106 represents a potential solution to the deadlock problem, this technique, when used in conjunction with computer systems that conform to PCI Specification Rev. 2.1. Latency Guidelines, may give rise to undesirable race conditions. With reference to the previous examples of deadlock conditions, a CPU-PCI/PCI-DRAM deadlock condition may be detected, causing CPU 106 to be backed off to allow the pending PCI-DRAM transaction to proceed. Simultaneously, however, the pending PCI-DRAM transaction may be terminated by PCI slave 128 in accordance with the above-mentioned latency guidelines or may naturally terminate ("natural termination") when all data has been written into write buffer 210, which may cause PCI bus 102 to be rearbitrated back to PCI master 126 by PCI arbiter 130.

As a consequence, the pending CPU-PCI transaction is allowed to erroneously proceed on PCI bus 102 at the same time as the deadlock detection mechanism tries to resolve the deadlock condition by backing off CPU 106 and canceling the same CPU-PCI transaction that is now starting on the PCI bus 102. Under this scenario, when CPU 106 is next allowed on PCI bus 102, e.g., after the PCI-DRAM transaction is completed, CPU 106 will repeat the request that was backed off, thereby erroneously causing another CPU-PCI transaction of the type performed earlier to again be performed.

Further, CPU 106 may be backed off time and time again, simultaneous with the cancellation of the PCI-DRAM transaction (in conformity with the latency guidelines). As a result, neither CPU 106 nor PCI master 114 may accomplish its intended transaction, with adverse consequence to system performance and reliability.

Figure 3:
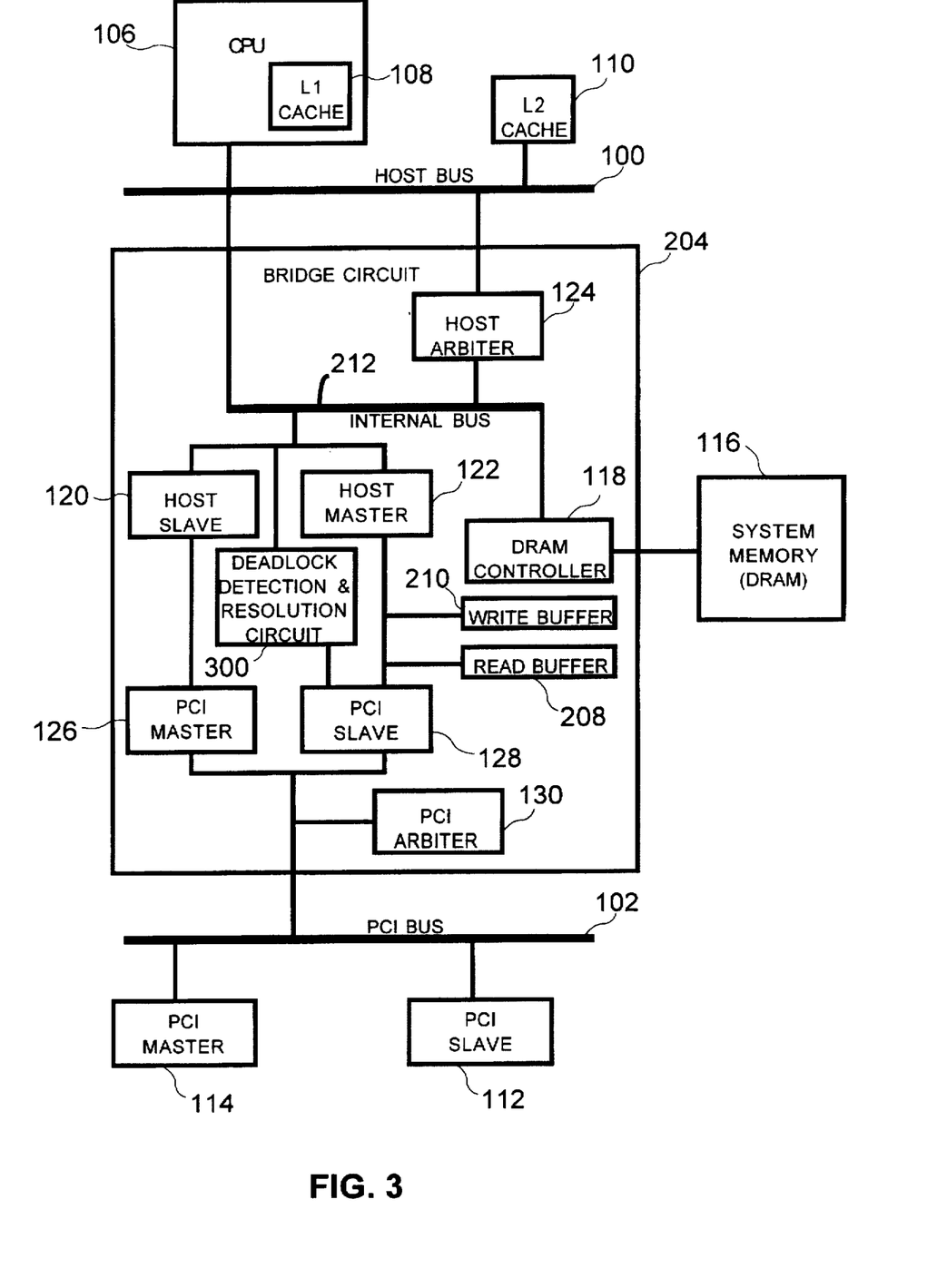
FIG. 3 illustrates, in accordance with one embodiment of the present invention, a block diagram of the computer system of FIG. 2, further including a deadlock detection and resolution circuit.

In accordance with one aspect of the present invention, the aforementioned deadlock condition is alleviated by the addition of a deadlock detection and resolution circuit (DDRC) 300, as illustrated in FIG. 3. DDRC 300 is connected to host arbiter 124, host slave 120, host master 122, PCI master 126, and PCI slave 128 for detecting when a potential deadlock condition occurs, determining if an actual deadlock condition exists and resolving any existing deadlock conditions. It should be understood that DDRC 300 may take the form of additional circuitry, including electronic components and interconnections residing at or coupled to host arbiter 124, host slave 120, host master 122, PCI master 126, and/or PCI slave 128, or may be embodied through existing circuits, which operate in accordance with the method steps herein.

In arriving at the invention disclosed herein, it is recognized that race conditions occur because the behavior of bridge circuit 204 is non-deterministic under a CPU-PCI/PCI-DRAM deadlock condition because of the latency requirements or natural termination, which may retry the PCI master that initiates the PCI-DRAM transaction the independent of the state of the CPU-PCI transaction. In accordance with one aspect of the present invention, the deadlock problem and race condition is resolved by introducing a tightly coupled, asynchronous handshake signal between DDRC 300, which operates in the CPU clock domain, and the slave interfaces of bridge circuit 204, ie., PCI slave 128, which operate in the PCI clock domain. The use of an asynchronous handshake signal that goes across the CPU/PCI clock boundary is advantageous since it permits the handshaking between DDRC 300 and PCI slave 128 to be tightly coupled irrespective of the clock speeds of host bus 100 and PCI bus 102. Advantageously, the use of the asynchronous handshake signal permits DDRC 300 to be employed irrespective of changes in the CPU and PCI clock speeds. The clock frequencies of host bus 100 and PCI bus 102 are indeterminate since they may be changed as needed as PCI peripherals and CPU's improve in their operating speeds.

In accordance with one embodiment of the present invention, when DDRC 300 detects a potential CPU-PCI/PCI-DRAM deadlock condition, instead of immediately backing off CPU 106 to resolve the deadlock condition, which could lead to race conditions as described above, DDRC 300 first asserts an asynchronous handshake signal to the PCI slave interface of bridge circuit 204, e.g., to PCI slave 128. The potential CPU-PCI/PCI-DRAM deadlock condition may be detected by, for example, using host arbiter 124 to ascertain that host slave 120 is busy (indicative of a pending CPU-PCI transaction) and that there is a request from host master 122 to host arbiter 130 to request mastership of host bus 100 (indicative of a pending PCI-DRAM transaction). Since DDRC 300 operates in the CPU clock domain and PCI slave 128 operates in the PCI clock domain, the asynchronous handshake signal from DDRC 300 to PCI slave 128 must traverse the CPU/PCI clock boundary.

Once PCI slave 128 receives the asynchronous handshake signal, DDRC 300 checks to see whether PCI slave 128 is still unable to complete its pending PCI-DRAM transaction. In one embodiment, PCI slave 128 is deemed unable to complete its pending PCI-DRAM status if the latency timer is disabled and PCI slave 128 is stalling on a memory read or a memory write. To elaborate, the latency timer is disabled when PCI 114, i.e., the entity that initiates the PCI-DRAM cycle, has not been retried in accordance with the latency guidelines. PCI slave 128 is stalling on a memory read if it is waiting for host master 122, acting on behalf of PCI master 114 in the PCI-DRAM transaction, to read from memory (either L1 cache 108, L2 cache 110, or DRAM 116). PCI slave 128 is stalling on a memory write if it is waiting for write buffer 210, which receives data from PCI master 114 (via PCI slave 128), to write to memory. Stalling on either memory read or memory write by PCI slave 128 indicates that the pending PCI-DRAM transaction cannot proceed unless mastership of host bus 100 is obtained to service the PCI-DRAM transaction.

If PCI slave 128 is unable to complete its pending PCI-DRAM transaction, PCI slave 128 then asserts an asynchronous handshake acknowledge signal to PCI master 126 to disable PCI master 126 and also to DDRC 300. This asynchronous handshake acknowledge signal requests PCI master 126 to stop servicing the pending CPU-PCI transaction at PCI master 126, thereby effectively canceling it. Because of the assertion of the asynchronous handshake acknowledge signal, PCI master 126 will not request PCI bus 102 from PCI arbiter 130 (to service the canceled CPU-PCI transaction) until this asynchronous handshake acknowledge signal is deasserted.

Simultaneous with the assertion of the asynchronous handshake acknowledge signal from PCI slave 128, DDRC 300 also backs off CPU 106, thereby causing CPU 106 to cancel its CPU-PCI transaction. When the PCI-DRAM transaction is cleared, either when PCI master 114 is retried due to the latency guidelines or when the PCI-DRAM transaction is completed, the condition that causes the deadlock is effectively resolved. DDRC 300 then deasserts the asynchronous handshake signal to PCI slave 128. The deassertion of the asynchronous handshake signal causes the asynchronous handshake acknowledge signal to be deasserted, thereby freeing PCI master 126 to service the canceled CPU-PCI transaction when it is next repeated by CPU 106.

As is apparent from the foregoing, deadlock detection and resolution in accordance with the present invention can be achieved reliably and predictably. The asynchronous handshake acknowledge signal, whose assertion causes the backing off of CPU 106 and cancellation of the CPU-PCI transaction, is asserted only under predefined conditions. If PCI slave 128 times out PCI master 114 under the latency guideline, for example, the asynchronous handshake acknowledge signal will not be asserted in response to the assertion of the asynchronous handshake signal (which indicates a potential deadlock). Without the asynchronous handshake acknowledge signal being asserted, CPU 106 will not be backed off, thereby allowing the CPU-PCI transaction to complete.

On the other hand, if PCI slave 128 does not time out under the latency guideline and it is further ascertained that memory stalling has occurred, the asynchronous handshake acknowledge signal will be asserted to cancel the pending CPU-PCI transaction, to back off CPU 106, and to allow the PCI-DRAM transaction an opportunity to either be timed out (under the latency guideline) or to complete with mastership of host bus 100. In one embodiment, CPU 106 is backed off only when 1) host slave 120 is busy (indicative of a pending CPU-PCI transaction), 2) host master 122 is busy (indicative of a pending PCI-DRAM transaction), 3) the asynchronous handshake signal is asserted, and 4) the asynchronous handshake acknowledge signal is asserted. In one embodiment, PCI slave 128 can determine that it is currently in the last data phase of the PCI-DRAM transaction and will be off PCI bus 102 shortly, thereby rendering PCI bus 102 available in the near future to service the CPU-PCI transaction. In this case, PCI slave 128 can choose not to assert the asynchronous handshake acknowledge signal to back off CPU 106, thereby allowing the CPU-PCI transaction to proceed upon the completion of the PCI-DRAM transaction.

Note that the handshaking and handshaking acknowledge signals, in addition to being asynchronous and capable of traversing the CPU/PCI clock boundary, are also tightly coupled. The asynchronous handshake signal from DDRC 300 to PCI slave 128 will not be deasserted until host arbiter 124 sees the assertion of the asynchronous handshake acknowledge signal from PCI slave 128. Likewise, the asynchronous handshake acknowledge signal to host arbiter 124 will not be deasserted until after the deassertion of the original asynchronous handshake signal. Because of this, the deadlock resolution technique of the invention remains robust across a wide range of PCI bus speed and host bus speed. In this manner, the adaptation of the present invention to future products, which may be operating at different speeds, may be easily accomplished.

Figure 4:
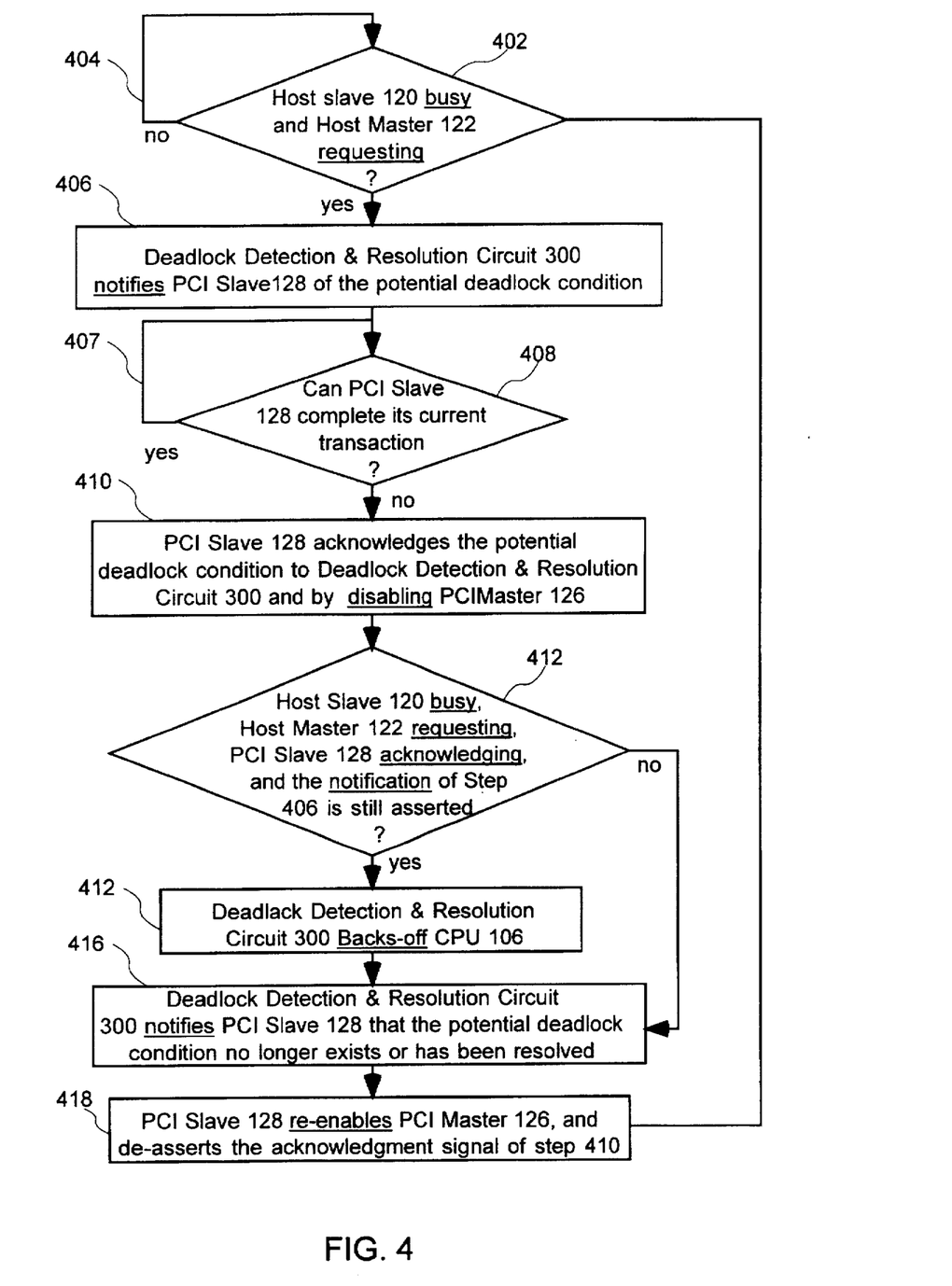
FIG. 4 illustrates, in accordance with one embodiment of the present invention, the deadlock detection and resolution process.

FIG. 4 illustrates, in accordance with one embodiment of the present invention, the deadlock detection and resolution process. Deadlock detection and resolution process 400 begins with step 402, wherein the DDRC 300, as shown in FIG. 3, determines if host slave 120 is busy and at the same time, host master 122 is requesting access to host bus 100. In step 402, if host slave 120 is busy and host master 122 is requesting, then there is a potential deadlock condition. In all other cases there is not a potential deadlock condition, and therefore, DDRC 300 continues to test for potential deadlocks conditions as represented by iterative loop 404.

In one embodiment, DDRC 300 monitors the operational status of host slave 120 to detect when host slave 120 is "busy", that is currently being accessed by another circuit via host bus 100. This may be accomplished, for example, by monitoring the voltage of a specific signal from host slave 120, or by reading and processing stored logic values. Similarly, DDRC 300 monitors the operational status of host master 122 to detect when host master 122 is "requesting", that is currently requesting mastership of host bus 100 from host arbiter 124. This may also be accomplished, for example, by monitoring the voltage of a specific signal from host master 122, or by reading and processing stored logic values.

Upon detecting a potential deadlock condition, DDRC 300 notifies PCI slave 128 of the potential deadlock condition, as shown in step 406. In one embodiment, DDRC 300 issues a notification signal, i.e., the aforementioned asynchronous handshake signal, to PCI slave 128.

Upon receipt of notification from the deadlock detection resolution circuit of a potential deadlock condition, PCI slave 128 determines if the current PCI-DRAM transaction may be completed, as illustrated in step 408. PCI slave 128 determines whether the current read or write transaction may be completed based upon the status of a latency timer, which may be either enabled or disabled, and the status of the PCI-DRAM transaction being attempted by PCI slave 128.

If the latency timer is enabled, i e., PCI slave 128 has timed out the PCI-DRAM transaction under the latency guidelines, the PCI-DRAM transaction has, as far as deadlock resolution is concerned, been "completed." In this case, there is no need to back off CPU 106, and the method iteratively returns to step 408 via path 407. Also, if PCI slave 128 is not stalling on a memory read or a memory write transaction, there is also no need to back off CPU 106 right away, and the method also returns to step 408 via path 407 to permit PCI slave 128 to complete its current transaction.

If the latency timer is disabled, i.e., PCI slave 128 has not timed out the PCI-DRAM transaction under the latency guidelines, PCI slave 128 then determines whether the current PCI-DRAM memory read or write transaction can be completed. The current PCI-DRAM memory read or write transaction cannot be completed it, for example, the current memory read or memory write transaction via read buffer 208, or write buffer 210 is "stalled" and cannot proceed unless mastership of host bus 100 is obtained to service the pending PCI-DRAM transaction.

If the latency timer is disabled and the current PCI-DRAM memory read or write transaction is stalled, the method proceeds to step 410 to acknowledge the potential deadlock condition to DDRC 300, and to disable PCI master 126. In one embodiment, PCI slave 128 asserts an acknowledgment signal to DDRC 300, and a disabling signal on PCI master 126, which causes PCI master 126 to immediately stop servicing the pending CPU-PCI transaction and stop requesting from PCI arbiter 130 for mastership of PCI bus 102.

Upon receipt of the acknowledgment from PCI slave 128 of the deadlock condition, DDRC 300 will then verify whether an actual deadlock condition exists. An actual deadlock condition exists, as shown in step 412, if host slave 120 is busy, host master 122 is requesting for mastership of host bus 100, the notification signal from DDRC 300 to PCI slave 128 is asserted, and at the same time, the acknowledgment signal from PCI slave 128 is also asserted If, in accordance with step 412 an actual deadlock condition exists, then deadlock detection and resolution process 400 proceeds to step 414. Step 414, at which point an actual deadlock condition exists, requires the DDRC 300 to forcibly "back-off" CPU 106. By backing-off CPU 106, DDRC 300 forces CPU 106 to stop all current or pending transactions over host bus 100, and to relinquish mastership of host bus 100. In one embodiment, DDRC 300 asserts a "back-off" interrupt signal to CPU 106, which forces CPU 106 to immediately relinquish mastership of host bus 100. After CPU 106 has been backed-off of host bus 100 by DDRC 300, then deadlock detection and resolution process 400 proceeds to step 416.

If instead, step 412 fails to verify that an actual deadlock condition exists then deadlock detection and resolution process 400 will also proceed to step 416. In step 416, DDRC 300 notifies PCI slave 128 that the potential deadlock condition no longer exists, or that it has been resolved. In one embodiment, this is accomplished by DDRC 300 de-asserting, or removing, the notification signal previously asserted (from DDRC 300 to PCI slave 128).

Once notified by DDRC 300 that the deadlock condition no longer exists or has been resolved, PCI slave 128 re-enables PCI master 126, and deasserts the acknowledgment of the potential deadlock condition (step 418). In one embodiment, step 418 is accomplished by PCI slave 128 de-asserting, or removing, both the acknowledgment signal previously asserted (from PCI slave 128 to DDRC 300), and the disabling signal previously asserted (from PCI slave 128 to PCI master 126). Once PCI master 126 is re-enabled, it may then service the canceled CPU-PCI transaction when this transaction is next repeated by CPU 106. Following de-assertion of these signals, deadlock detection and resolution process 400, as shown in FIG. 4, returns to step 402 to again monitor for potential deadlock conditions.

As can be appreciated from the foregoing, the inventive deadlock detection and resolution mechanism advantageously avoids the above-mentioned race condition by effectively causing PCI slave 128 to sample for a deadlock at a particular time (when it detects the handshake signal from DDRC 300). DDRC 300 and PCI slave 128 then commit to that deadlock at that sample time even if the deadlock condition automatically clears itself at PCI slave 128 by the action of the latency timeout or by a natural termination. In this manner, no system performance or functionality compromises need be made to achieve predictable and reliable operation when a deadlock occurs. Further, the inventive mechanism permits deadlock and possible race conditions to be resolved in a deterministic manner within a fully concurrent and asynchronously clocked system that conforms to the PCI Specification Rev. 2.1. Latency Guidelines.

While this invention has been described in terms of several preferred embodiments, there are alterations, permutations, and equivalents which fall within the scope of this invention. By way of example, although the system memory ("memory") has been referred herein as a dynamic random access memory block (DRAM), it may in fact be implemented by any suitable memory technology, including flash memory, nonvolatile memory such as disk-based memory (optical and/or magnetic), static memory, and the like. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a bridge circuit coupled to a memory, a host bus and a PCI bus of a computer system, said host bus and said PCI bus being configured to operate concurrently and asynchronously, said bridge circuit including a host master circuit and a PCI slave circuit coupled between said host bus and said PCI bus and configured to service a PCI-MEMORY instruction from an external PCI master coupled to said PCI bus, a PCI master circuit and a host slave circuit coupled between said PCI bus and said host bus and configured to service a CPU-PCI transaction from a CPU coupled to said host bus, a method for resolving a deadlock condition, said deadlock condition occurs when a PCI-MEMORY transaction proceeds simultaneously with an issuance of said CPU-PCI transaction, comprising:

upon detecting said deadlock condition, asserting an asynchronous handshake signal to said PCI slave of said bridge circuit;

determining whether said PCI slave is still able to complete said PCI-MEMORY transaction; and if said PCI slave is unable to complete said PCI-MEMORY transaction, asserting an asynchronous handshake acknowledge signal to cancel said CPU-PCI transaction and removing said deadlock condition, wherein said asynchronous handshake acknowledge signal is sent to said PCI master to cause said PCI master to stop serving said CPU-PCI transaction at said PCI master, thereby effectively canceling said CPU-PCI transaction at said PCI master.

2. The method of claim 1 wherein said PCI slave is deemed unable to complete said PCI-MEMORY transaction if a predefined latency time period associated with a protocol of said PCI bus has not expired for said PCI-MEMORY transaction, and said PCI slave is stalling on one of a memory read or a memory write operations.

3. The method of claim 2 wherein said latency time period is in compliance with a PCI Specification Guideline, Rev. 2.1.

4. The method of claim 1 wherein said asynchronous handshake acknowledge signal is further sent to said CPU to back off said CPU, thereby canceling said CPU-PCI transaction at said CPU.

5. The method of claim 1 further comprising deasserting said asynchronous handshake signal when said deadlock condition is removed.

6. The method of claim 5 further comprising deasserting said asynchronous handshake acknowledge signal responsive to said asynchronous handshake signal being deasserted.

7. The method of claim 1 wherein said deadlock condition is removed when said PCI-MEMORY transaction is completed.

8. The method of claim 1 wherein said deadlock condition is removed when said PCI-MEMORY transaction is retried responsive an expiration of a predefined latency time period associated with a protocol of said PCI bus for said PCI-MEMORY transaction.

9. In a bridge circuit coupled to a memory, a host bus and a PCI bus of a computer system, said host bus and said PCI bus being configured to operate concurrently and asynchronously, said bridge circuit including a host master circuit and a PCI slave circuit coupled between said host bus and said PCI bus and configured to service a PCI-MEMORY instruction from an external PCI master coupled to said PCI bus, a PCI master circuit and a host slave circuit coupled between said PCI bus and said host bus and configured to service a CPU-PCI transaction from a CPU coupled to said host bus, a deadlock detection and resolution circuit for resolving a deadlock condition, said deadlock condition occurs when a PCI-MEMORY transaction proceeds simultaneously with an issuance of said CPU-PCI transaction, comprising:

means for asserting an asynchronous handshake signal to said PCI slave of said bridge circuit;

means for determining whether said PCI slave is still able to complete said PCI-MEMORY transaction; and means for asserting an asynchronous handshake acknowledge signal to cancel said CPU-PCI transaction and removing said deadlock condition if said PCI slave is unable to complete said PCI-MEMORY transaction, and wherein said asynchronous handshake acknowledge signal is sent to said PCI master to cause said PCI master to stop serving said CPU-PCI transaction at said PCI master, thereby effectively canceling said CPU-PCI transaction at said PCI master.

10. The deadlock detection and resolution circuit of claim 9 wherein said PCI slave is deemed unable to complete said PCI-MEMORY transaction if a predefined latency time period associated with a protocol of said PCI bus has not expired for said PCI-MEMORY transaction, and said PCI slave is stalling on one of a memory read or a memory write operations.

11. The deadlock detection and resolution circuit of claim 10 wherein said latency time period is in compliance with a PCI Specification Guideline, Rev. 2.1.

12. The deadlock detection and resolution circuit of claim 9 wherein said asynchronous handshake acknowledge signal is further sent to said CPU to back off said CPU, thereby canceling said CPU-PCI transaction at said CPU.

13. The deadlock detection and resolution circuit of claim 9 further comprising means for deasserting said asynchronous handshake signal when said deadlock condition is removed.

14. The deadlock detection and resolution circuit of claim 13 further comprising means for deasserting said asynchronous handshake acknowledge signal responsive to said asynchronous handshake signal being deasserted.

15. The deadlock detection and resolution circuit of claim 9 wherein said deadlock condition is removed when said PCI-MEMORY transaction is completed.

16. The deadlock detection and resolution circuit of claim 9 wherein said deadlock condition is removed when said PCI-MEMORY transaction is retried responsive an expiration of a predefined latency time period associated with a protocol of said PCI bus for said PCI-MEMORY transaction.

17. In a bridge circuit coupled to a memory, a host bus and a PCI bus of a computer system, said host bus and said PCI bus being configured to operate concurrently and asynchronously, said bridge circuit including a host master circuit and a PCI slave circuit coupled between said host bus and said PCI bus and configured to service a PCI-MEMORY instruction from an external PCI master coupled to said PCI bus, a PCI master circuit and a host slave circuit coupled between said PCI bus and said host bus and configured to service a CPU-PCI transaction from a CPU coupled to said host bus, a deadlock detection and resolution circuit for resolving a deadlock condition, said deadlock condition occurs when a PCI-MEMORY transaction proceeds simultaneously with an issuance of said CPU-PCI transaction, comprising:

first circuit for asserting an asynchronous handshake signal to said PCI slave of said bridge circuit;

second circuit for determining whether said PCI slave is still able to complete said PCI-MEMORY transaction; and third circuit for asserting an asynchronous handshake acknowledge signal to cancel said CPU-PCI transaction and removing said deadlock condition if said PCI slave is unable to complete said PCI-MEMORY transaction, and wherein said asynchronous handshake acknowledge signal is sent to said PCI master to cause said PCI master to stop serving said CPU-PCI transaction at said PCI master, thereby effectively canceling said CPU-PCI transaction at said PCI master.

18. The deadlock detection and resolution circuit of claim 17 wherein said PCI slave is deemed unable to complete said PCI-MEMORY transaction if a predefined latency time period associated with a protocol of said PCI bus has not expired for said PCI-MEMORY transaction, and said PCI slave is stalling on one of a memory read or a memory write operations.

19. The deadlock detection and resolution circuit of claim 18 wherein said latency time period is in compliance with a PCI Specification Guideline, Rev. 2.1.

20. The deadlock detection and resolution circuit of claim 17 wherein said asynchronous handshake acknowledge signal is further sent to said CPU to back off said CPU, thereby canceling said CPU-PCI transaction at said CPU.

21. The deadlock detection and resolution circuit of claim 17 further comprising a fourth circuit for deasserting said asynchronous handshake signal when said deadlock condition is removed.

22. The deadlock detection and resolution circuit of claim 21 further comprising a fifth circuit for deasserting said asynchronous handshake acknowledge signal responsive to said asynchronous handshake signal being deasserted.

23. The deadlock detection and resolution circuit of claim 17 wherein said deadlock condition is removed when said PCI-MEMORY transaction is completed.

24. The deadlock detection and resolution circuit of claim 17 wherein said deadlock condition is removed when said PCI-MEMORY transaction is retried responsive an expiration of a predefined latency time period associated with a protocol of said PCI bus for said PCI-MEMORY transaction.

* * * * *